US008962706B2

(12) United States Patent
Pawloski et al.

(10) Patent No.: US 8,962,706 B2
(45) Date of Patent: Feb. 24, 2015

(54) PROCESS FOR ENABLING SECONDARY EXPANSION OF EXPANDABLE BEADS

(75) Inventors: Adam R. Pawloski, Lake Elmo, MN (US); Jeffrey J. Cernohous, Hudson, WI (US); Kent Kaske, Woodbury, MN (US); Garrett Van Gorden, River Falls, WI (US)

(73) Assignee: Lifoam Industries, LLC, Hunt Valley, MD (US)

( * ) Notice: Subject to any disclaimer, the term of this patent is extended or adjusted under 35 U.S.C. 154(b) by 76 days.

(21) Appl. No.: 13/230,158

(22) Filed: Sep. 12, 2011

(65) Prior Publication Data
US 2012/0065286 A1 Mar. 15, 2012

Related U.S. Application Data

(60) Provisional application No. 61/381,750, filed on Sep. 10, 2010.

(51) Int. Cl.
*C08J 9/00* (2006.01)
*C08J 9/232* (2006.01)
*B29C 44/34* (2006.01)
*B29B 9/06* (2006.01)
*B29C 47/00* (2006.01)
*B29K 25/00* (2006.01)
*B29K 67/00* (2006.01)
*B29C 47/92* (2006.01)

(52) U.S. Cl.
CPC .............. *C08J 9/232* (2013.01); *B29C 44/3461* (2013.01); *B29B 9/06* (2013.01); *B29C 47/0042* (2013.01); *C08J 2201/03* (2013.01); *C08J 2203/184* (2013.01); *C08J 2205/052* (2013.01); *C08J 2367/04* (2013.01); *B29K 2025/06* (2013.01); *B29K 2067/046* (2013.01); *B29K 2995/006* (2013.01); *B29K 2995/0056* (2013.01); *B29C 47/0011* (2013.01); *B29C 47/0066* (2013.01); *B29C 47/92* (2013.01)
USPC ................. 521/56; 60/172; 60/182; 60/189

(58) Field of Classification Search
CPC .. C08J 9/232; C08J 2201/03; C08J 2203/184; C08J 2205/052; C08J 2367/04
USPC ........................ 521/56, 60, 172, 182, 189, 58
See application file for complete search history.

(56) References Cited

U.S. PATENT DOCUMENTS

| | | | |
|---|---|---|---|
| 2,950,261 A | 8/1960 | Buchholz et al. | |
| 3,709,806 A * | 1/1973 | Minami et al. | 521/50.5 |
| 3,949,145 A | 4/1976 | Otey et al. | |
| 4,473,665 A | 9/1984 | Martini-Vvedensky et al. | |
| 4,702,868 A * | 10/1987 | Pontiff et al. | 264/50 |
| 5,134,171 A | 7/1992 | Hammel et al. | |
| 5,158,986 A | 10/1992 | Cha et al. | |
| 5,198,163 A | 3/1993 | Yamamoto et al. | |
| 5,314,754 A | 5/1994 | Knight | |
| 5,316,578 A | 5/1994 | Buehler et al. | |
| 5,322,866 A | 6/1994 | Mayer et al. | |
| 5,362,777 A | 11/1994 | Tomka | |
| 5,374,304 A | 12/1994 | Frische et al. | |
| 5,437,924 A | 8/1995 | Decker, III et al. | |
| 5,444,113 A | 8/1995 | Sinclair et al. | |
| 5,449,708 A | 9/1995 | Schiltz | |
| 5,496,895 A | 3/1996 | Chinnaswamy et al. | |
| 5,569,692 A | 10/1996 | Bastioli et al. | |
| 5,605,937 A | 2/1997 | Knaus | |
| 5,760,118 A | 6/1998 | Sinclair et al. | |
| 5,766,749 A | 6/1998 | Kakinoki | |
| 5,854,345 A | 12/1998 | Xu et al. | |
| 5,866,053 A | 2/1999 | Park et al. | |
| 6,184,261 B1 | 2/2001 | Biby et al. | |
| 6,214,907 B1 | 4/2001 | Tomka | |
| 6,221,926 B1 | 4/2001 | Oohara et al. | |
| 6,235,380 B1 | 5/2001 | Tupil et al. | |
| 6,271,272 B1 | 8/2001 | Carlier et al. | |
| 6,306,921 B1 * | 10/2001 | Al Ghatta et al. | 521/182 |
| 6,376,059 B1 | 4/2002 | Anderson et al. | |
| 6,458,858 B1 | 10/2002 | Braun | |
| 6,593,384 B2 | 7/2003 | Anderson et al. | |
| 6,723,264 B1 | 4/2004 | Bussey, Jr. et al. | |
| 6,740,731 B2 | 5/2004 | Bigg et al. | |
| 6,787,580 B2 | 9/2004 | Chonde et al. | |

(Continued)

FOREIGN PATENT DOCUMENTS

CA  2202869  5/1996
EP  1 378 538 A1  1/2004

(Continued)

OTHER PUBLICATIONS

Machine Translation of JP2007-186692, Jul. 2007.*
Synbra, press release for BioFoam, undated.
Sekisui Plastics Co., Ltd, press release entitled "Success in developing the foamed plastic by beads method-employed plant-derived resin, with a dimensional stability under 150 C", Oct. 23, 2007.
Noordegraaf, Cradle to Cradle Certified PLA Foam, bioplastics magazine, Jan. 2010, pp. 24-25, vol. 5.
Henton, David E. et al., Chapter 16 Polylactic Acid Technology, Natural Fibers, Biopolymers, and Biocomposites, 2005, pp. 527-577, CRC Press.

(Continued)

*Primary Examiner* — Irina S Zemel
(74) *Attorney, Agent, or Firm* — Whiteford, Taylor & Preston, LLP; Joseph L. Morales

(57) ABSTRACT

The present invention enables the secondary expansion of lightweight foamed beads. The foamed beads are produced using a compound comprising a compostable or biobased polyester and a physical blowing agent as well as a chemical blowing agent. Secondary expansion can be used either to lower the density of the foamed bead further or to enable expansion of the beads during molding to promote fusion. The foam beads can be produced using conventional melt processing techniques, such as single and twin-screw extrusion processes.

35 Claims, No Drawings

(56) References Cited

U.S. PATENT DOCUMENTS

| | | |
|---|---|---|
| 6,833,403 B1 | 12/2004 | Bladel et al. |
| 6,903,053 B2 | 6/2005 | Noda et al. |
| 7,226,615 B2 | 6/2007 | Yuksel et al. |
| 7,297,394 B2 | 11/2007 | Khemani et al. |
| 7,358,296 B2 | 4/2008 | Bladel et al. |
| 7,495,044 B2 | 2/2009 | Long et al. |
| 7,524,891 B2 | 4/2009 | Rose et al. |
| 7,615,183 B2 | 11/2009 | Tweed et al. |
| 7,671,112 B2 | 3/2010 | Hintzer et al. |
| 7,863,343 B2 | 1/2011 | Haraguchi |
| 2003/0236329 A1 | 12/2003 | Kawamoto et al. |
| 2005/0094482 A1 | 5/2005 | Foster |
| 2006/0167122 A1 | 7/2006 | Haraguchi et al. |
| 2006/0223723 A1 | 10/2006 | Provan |
| 2007/0254060 A1 | 11/2007 | Errington et al. |
| 2007/0293593 A1 | 12/2007 | Harfmann |
| 2008/0033077 A1 | 2/2008 | Hashimoto et al. |
| 2008/0146686 A1 | 6/2008 | Handa |
| 2009/0234035 A1 | 9/2009 | Cheung et al. |
| 2009/0306287 A1 | 12/2009 | Chung |
| 2010/0029793 A1 | 2/2010 | Witt et al. |
| 2010/0056656 A1 | 3/2010 | Matsuoka |
| 2010/0098928 A1 | 4/2010 | Britton et al. |
| 2010/0120932 A1 | 5/2010 | Yoshioka et al. |
| 2010/0136338 A1 | 6/2010 | Hirai et al. |
| 2012/0007267 A1 | 1/2012 | Pawloski |
| 2012/0009420 A1 | 1/2012 | Pawloski |
| 2012/0010307 A1 | 1/2012 | Pawloski |

FOREIGN PATENT DOCUMENTS

| | | | |
|---|---|---|---|
| JP | 0509323 A | * | 1/1993 |
| JP | 08-198992 | | 8/1996 |
| JP | 2000-017038 | | 1/2000 |
| JP | 2002-179832 | | 6/2002 |
| JP | 2002-302567 | | 10/2002 |
| JP | 2003-073495 | | 3/2003 |
| JP | 2003-301067 | | 10/2003 |
| JP | 2004-277440 | | 10/2004 |
| JP | 2005-264166 | | 9/2005 |
| JP | 2006-002137 | | 1/2006 |
| JP | 2007-100026 | | 4/2007 |
| JP | 2007-126539 | | 5/2007 |
| JP | 2007-169394 | | 7/2007 |
| JP | 2007186692 A | * | 7/2007 |
| JP | 2008-214423 | | 9/2008 |
| WO | 98/08667 A2 | | 3/1998 |
| WO | 98/31521 A2 | | 7/1998 |
| WO | 99/32544 A1 | | 7/1999 |
| WO | 2008/093284 A1 | | 8/2008 |
| WO | 2008/130226 A2 | | 10/2008 |
| WO | WO2008-123367 | * | 10/2008 |
| WO | 2011038081 A1 | | 3/2011 |

OTHER PUBLICATIONS

Enhancing Biopolymers: Additives Are Needed For Toughness, Heat Ressistance & Processability (2008).
Office Action, Co-Pending U.S. Appl. No. 13/178,293, Date Oct. 12, 2012.
Office Action, Co-Pending U.S. Appl. No. 13/178,300, Date Jan. 18, 2013.

* cited by examiner

PROCESS FOR ENABLING SECONDARY EXPANSION OF EXPANDABLE BEADS

CROSS REFERENCE TO RELATED APPLICATION

This application is based upon and claims benefit of co-owned U.S. Provisional Patent Application Ser. No. 61/381,750 entitled "Process for Enabling Secondary Expansion of Expandable Beads", filed with the U.S. Patent and Trademark Office on Sep. 10, 2010 by the inventors herein, the specification of which is incorporated herein by reference.

BACKGROUND

1. Field of the Invention

This invention relates generally to novel methods for producing lightweight, foams and, in particular, to methods for producing foams using melt processing techniques and blowing agents combining physical and chemical blowing agents to enable secondary expansion of the foam.

2. Description of the Background

Polymeric foams include a plurality of voids, also called cells, in a polymer matrix. By replacing solid plastic with voids, polymeric foams use fewer raw materials than solid plastics for a given volume. Thus, by using polymeric foams instead of solid plastics, material costs can be reduced in many applications. Additionally, foams are very good insulators that can seal building structures from air and moisture intrusion, save on utility bills, and add strength to the building.

The material used for expandable polystyrene (EPS) is typically an amorphous polymer that exhibits a glass transition temperature of about 95° C. The process of converting EPS resins into expanded polystyrene foam articles requires three main stages: pre-expansion, maturation, and molding. Expandable beads produced from polystyrene and a blowing agent are made, and then expanded by steam in a pre-expander. The purpose of pre-expansion is to produce foam particles of the desired density for a specific application. During pre-expansion, the EPS beads are fed to a pre-expander vessel containing an agitator and controlled steam and air supplies. The introduction of steam into the pre-expander yields two effects: the EPS beads soften and the blowing agent that is dispersed within the EPS beads, typically pentane, heats to a temperature above its boiling point. These two conditions cause the EPS beads to expand in volume. The diameter of the particles increases while the density of the resin decreases. The density of pre-expanded granules is about 1000 kg/m$^3$, and that of expanded beads lies in the range of 20 to 200 kg/m$^3$; depending on the process, a 5 to 50 times reduction in density may be achieved.

Maturation serves several purposes. It allows the vacuum that was created within the cells of the foam particles during pre-expansion to reach equilibrium with the surrounding atmospheric pressure. It permits residual moisture on the surface of the foam particles to evaporate. And, it provides for the dissipation of excess residual blowing agent. Maturation time depends on numerous factors, including blowing agent content of the original resin, pre-expanded density, and environmental factors. Pre-expanded beads that are not properly matured are sensitive to physical and thermal shock. Molding of such beads before maturation may cause the cells within the particles to rupture, thereby producing an undesirable molded foam part.

Once the pre-expanded beads have matured, they are transferred to a molding machine containing one or more cavities that are shaped for the desired molded foam article(s). The purpose of molding is to fuse the foam particles together into a single foam part. Molding of EPS may follow a simple sequence: first, fill the mold cavity with pre-expanded beads; heat the mold by introducing steam; cool the molded foam article within the mold cavity; and eject the finished part from the mold cavity. The steam that is introduced to the molding machine causes the beads to soften and expand even further due to release of residual blowing agent, such as pentane. The combination of these two effects in an enclosed cavity allows the individual particles to fuse together into a single solid foam part.

There is an increasing demand for many plastic products used in packaging to be biodegradable, for example trays in cookie and candy packages. Starch films have been proposed as biodegradable alternatives for some time. A common approach to creating biodegradable products is to combine polylactic acid (PLA) with starch to create a hydrolytically degradable composition. Difficulties have been encountered in producing starch based polymers particularly by hot melt extrusion. The molecular structure of the starch is adversely affected by the shear stresses and temperature conditions needed to plasticize the starch and pass it through an extrusion die.

Blowing agents typically are introduced into polymeric material to make polymer foams in one of two ways. According to one technique, a chemical blowing agent is mixed with the polymer. The chemical blowing agent undergoes a chemical reaction in the polymeric material, typically under conditions in which the polymer is molten, causing formation of a gas. Chemical blowing agents generally are low molecular weight organic compounds that decompose at a particular temperature and release a gas such as nitrogen, carbon dioxide, or carbon monoxide. According to another technique, a physical blowing agent, i.e., a fluid that is a gas under ambient conditions, is injected into a molten polymeric stream to form a mixture. The mixture is subjected to a pressure drop, causing the blowing agent to expand and form bubbles (cells) in the polymer. Several patents and patent publications describe aspects of microcellular materials and microcellular processes.

U.S. Pat. No. 6,593,384 to Anderson et al. describes expandable particles produced using broad polymer materials and a physical blowing agent. U.S. Pat. No. 7,226,615 to Yuksel et al. describes an expandable foam based on broad disclosure of biomaterials combined with a bicarbonate blowing agent. U.S. Published Patent Application No. 2006/0167122 by Haraguchi et al. describes expandable particles derived from the combination of PLA, a blowing agent, and a polyolefin wax. U.S. Published Patent Application No. 2010/0029793 by Witt et al. describes a method of producing PLA foam by impregnating resin beads with carbon dioxide ($CO_2$).

U.S. Pat. No. 4,473,665 to Martini-Vvedensky et al. describes a process for making a foamed polymer having cells less than about 100 microns in diameter. In the described technique, a material precursor is saturated with a blowing agent, the material is placed under high pressure, and the pressure is rapidly dropped to nucleate the blowing agent and to allow the formation of cells. The material then is frozen rapidly to maintain a desired distribution of microcells.

U.S. Pat. No. 5,158,986 to Cha et al. describes formation of microcellular polymeric material using a supercritical fluid as a blowing agent. Using a batch process, the patent describes various processes to create nucleation sites.

U.S. Pat. No. 5,866,053 to Park et al. describes a continuous process for forming microcellular foam. The pressure on a single-phase solution of blowing agent and polymer is rapidly dropped to nucleate the material. The nucleation rate is high enough to form a microcellular structure in the final product.

International patent publication no. WO 98/08667 by Burnham et al. provides methods and systems for producing microcellular material and microcellular articles. In one method, a fluid, single-phase solution of a precursor of foamed polymeric material and a blowing agent is continuously nucleated by dividing the stream into separate portions and separately nucleating each of the separate portions, then recombining the streams. The recombined stream may be shaped into a desired form, for example by a shaping die.

It is generally accepted in the field that to create enough nucleation sites to form microcellular foams, one must use sufficient blowing agent to create a driving force for nucleation and a high enough pressure drop rate to prevent cell growth from dominating the nucleation event. As blowing agent levels are lowered, the driving force for nucleation decreases. Yet, while higher blowing agent levels can lead to smaller cells (a generally desirable result in the field of microcellular foams), according to conventional thought, higher blowing agent levels also can cause cell interconnection (which by definition increases cell size and can compromise structural and other material properties) and less-than-optimal surface properties (compromised surface properties at higher gas levels can result from the natural tendency of the blowing agent to diffuse out of the material).

In other words, it is generally accepted that there is a tradeoff between small cell size and optimal material properties as blowing agent levels in microcellular polymeric material are altered.

SUMMARY

Accordingly, it is an object of the present invention to provide a compostable or biobased foam that avoids the disadvantages of the prior art.

It is another object of the present invention to provide a method for producing compostable or biobased foams using melt processing techniques. A related object of the present invention is to provide a method for producing compostable or biobased foams using a combination of blowing agents.

It is another object of the present invention to provide a compostable or biobased foamed bead that can be processed using conventional molding equipment.

Another object of the present invention is to provide a foamed bead that is capable of chemically degrading into lower molecular weight materials by the process of composting.

A further object of the invention is to provide a compostable or biobased, foamed bead that can be fabricated into a three-dimensional shape.

These and other objects of the present invention are accomplished by providing a composition and process for producing foamed beads from a compostable or biobased polymer and for using such beads in producing a variety of items. In one embodiment, lightweight beads are produced by melt processing a compostable or biobased polymer and a combination of a physical blowing agent and a chemical blowing agent. In another embodiment, the melt processable composition includes additional additives that improve the rheological characteristics of the compostable or biobased polymer, making it more amenable for producing lightweight, foamed beads. The foamed beads of this invention can be further processed using conventional molding equipment to provide a lightweight, compostable or biobased, foamed article. Articles of this invention have utility in applications where conventional expandable polystyrene (EPS) is utilized today, including those applications relating to protective packaging, sound dampening, and thermal insulation.

Polymer compositions are widely utilized in numerous applications, including automotive, home construction, electronic and consumer good products. The polymers may be composed of either biobased polymers or petroleum-based polymers. Compostable or biobased polymers are preferred to address environmental concerns associated with disposal of the materials once they are no longer useful for their intended purpose and minimizing the use of petroleum. However, the polymers must meet certain physical and chemical characteristics in order for them to be suitable for the intended application. In expandable foams, the polymer composition must be able to be fabricated into a three dimensional shape that is lightweight and provides impact, sound, and thermal resistance or protection. The invention described herein discloses compostable or biobased foams having attributes that are required to form products that possess these attributes.

For purposes of the present invention, the following terms used in this application are defined as follows:

"Biodegradable Polymer" means a polymeric material or resin that is capable of chemically degrading into lower molecular weight materials.

"Compostable" means capable of undergoing biological decomposition, such that the material is not visually distinguishable and breaks down into carbon dioxide, water, inorganic compounds, and biomass.

"Biobased" means materials that are composed, in whole or in significant part, of biological products or renewable agricultural materials including plant, animal, and marine materials.

"Plasticizer" means a material that is compatible with a compostable or biobased polymer after melt processing. Addition of a plasticizer to a compostable or biobased polymer has the effect of lowering the modulus of the film composition.

"Chain Extender" means a material that when melt processed with a polymer, increases the molecular weight by reactively coupling chain ends.

"Melt Processable Composition" means a formulation that is melt processed, typically at elevated temperatures, by means of a conventional polymer processing technique such as extrusion or injection molding as an example.

"Melt Processing Techniques" means extrusion, injection molding, blow molding, rotomolding, or batch mixing.

"Extrudate" is the semisolid material that has been extruded and shaped into a continuous form by forcing the material through a die opening.

DETAILED DESCRIPTION OF EXEMPLARY EMBODIMENTS

The invention summarized above and defined by the enumerated claims may be better understood by referring to the following description. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

The present invention is directed toward a variety of products that are made of compostable or biobased materials. The compostable or biobased materials can include either or both of an externally or an internally modified polymer composition, as those terms are described below.

Biodegradability refers to a compound that is subject to enzymatic decomposition, such as by microorganisms, or a compound, portions of which are subject to enzymatic decomposition, such as by microorganisms. In one instance, for example, a polymer such as polylactic acid can be degraded by hydrolysis to individual lactic acid molecules that are subject to enzymatic decomposition by a wide variety of microorganisms. Microorganisms typically can consume carboxylic acid-containing oligomers with molecular weights of up to about 1000 daltons, and preferably up to about 600 daltons, depending on the chemical and physical characteristics of the oligomer.

Biobased means materials that are synthesized from biological sources and refers to ingredients that reduce the use of non-renewable resources by integrating renewable ingredients as a replacement for at least a portion of the materials in a product, for example, replacement of petroleum used in making EPS. Biobased ingredients can be used in many products without hindering their performance.

Composting is the biological process of breaking down organic waste into a useful substance by various microorganisms in the presence of oxygen.

Preferably, the polymer in the present materials breaks down by composting. The degradation characteristics of the polymer in the present materials depend in large part on the type of material being made with the polymer. Thus, the polymer needs to have suitable degradation characteristics so that when processed and produced into a final material, the material does not undergo significant degradation until after the useful life of the material.

The polymer of the present materials is further characterized as being compostable within a period in which products made from the materials break down after use. The materials of this invention degrade in a time period typically less than 180 days whereas similar mass-produced, nondegradable products typically require decades to centuries to break down naturally.

The present invention describes compostable or biobased foam beads that are useful for fabricating foamed articles. The foams of this invention are produced using a compound comprising a compostable or biobased thermoplastic polymer and a combination of blowing agents. Such compostable thermoplastic polymer material may be used to replace expandable polystyrene (EPS) with a foamed bead produced from the compostable or biobased polymer resin in the construction of foamed articles. Ideally, one would substitute polystyrene with a compostable or biobased polymer of the same chemical and physical properties.

Additives including plasticizers and chain extenders are optionally included in the compostable or biobased composition. Preferably, the polymer has greater than 50% biobased content, most preferably greater than 80% biobased. These foams can be produced using conventional melt processing techniques, such as single and twin-screw extrusion processes. In one embodiment, foamed beads are produced by cutting extrudate at the face of the extrusion die. The foamed bead is subsequently optionally cooled by contacting with water, water vapor, air, carbon dioxide, or nitrogen gas. After the bead is cut at the face of the die, the bead continues to foam, thus forming a closed cell foam structure with a continuous surface skin, i.e. there is no open cell structure at the surface of the bead. In one embodiment, the resulting compostable or biobased, foamed bead has a specific gravity less than 0.15 g/cm$^3$. In another embodiment, the compostable or biobased, foamed bead has a specific gravity of preferably less than 0.075 g/cm$^3$, and most preferably less than 0.05 g/cm$^3$. In some embodiments, more than 50 wt % of the foam contains materials that are compostable, as determined by ASTM D6400. In a preferred embodiment, more than 80 wt % of the foam contains materials that are compostable. In a most preferred embodiment, greater than 95 wt % of the foam contains materials that are compostable.

The compostable or biobased polymers of this invention are produced by melt processing compostable or biobased polymers with blowing agents and, optionally, additives that modify the rheology of the compostable or biobased polymer, including chain extenders and plasticizers. The compostable or biobased polymers may include those polymers generally recognized by one of ordinary skill in the art to decompose into compounds having lower molecular weights. Non-limiting examples of compostable or biobased polymers suitable for practicing the present invention include polysaccharides, peptides, polyesters, polyamino acids, polyvinyl alcohol, polyamides, polyalkylene glycols, and copolymers thereof.

In one aspect, the compostable or biobased polymer is a polyester. Non-limiting examples of polyesters include poly-lactic acids, poly-L-lactic acid (PLLA), poly-D-lactic acid (PDLA) and random or stereoregular copolymers of L-lactic acid and D-lactic acid, and derivatives thereof. Other non-limiting examples of polyesters include polycaprolactone, polyhydroxybutyric acid, polyhydroxyvaleric acid, polyethylene succinate, polybutylene succinate, polybutylene adipate, polymalic acid, polyglycolic acid, polysuccinate, polyoxalate, polybutylene diglycolate, and polydioxanone.

Preferred polymer resins for this invention include known compostable materials derived from biological sources (e.g. compostable biopolymer resins), but synthetic polymers capable of being composted may also be used. The biopolymer polylactic acid (PLA) is the most preferred example due to its known compostability and its biobased origins from agricultural (e.g. corn) feedstocks. Both amorphous and semi-crystalline PLA polymers can be used. Examples of compostable or biobased polymers include Ingeo 2002D and Ingeo 4060D grade plastics and Ingeo 8051D grade foam from NatureWorks, LLC, and Cereplast Compostable 5001.

In this invention, a compostable or biobased polymer is melt processed with the blowing agents to produce a lightweight foamed bead. Blowing agents are materials that can be incorporated into the melt processable composition (e.g., the premix of the additives, polymeric matrix, and/or optional fillers, either in melt or solid form) to produce cells through the release of a gas at the appropriate time during processing. The amount and types of blowing agents influence the density of the finished product by its cell structure. Any suitable blowing agent may be used to produce the foamed material.

There are two major types of blowing agents: physical and chemical. Physical blowing agents tend to be volatile liquids or compressed gases that change state during melt processing to form a cellular structure. In a preferred embodiment, the physical blowing agent is carbon dioxide. In the most preferred embodiment, the physical blowing agent of carbon dioxide in its supercritical state is mixed with the polymer melt. Chemical blowing agents tend to be solids that decompose (e.g., thermally, reaction with other products, and so forth) to form gaseous decomposition products. The gases produced are finely distributed in the melt processable composition to provide a cellular structure.

Chemical blowing agents can be divided into two major classifications: organic and inorganic. Organic blowing agents are available in a wide range of different chemistries, physical forms, and modification, such as, for example, azodicarbonamide. Inorganic blowing agents tend to be more limited. An inorganic blowing agent may include one or more carbonate salts such as Sodium, Calcium, Potassium, and/or Magnesium carbonate salts. Preferably, sodium bicarbonate is used because it is inexpensive and readily decomposes to form carbon dioxide gas. Sodium bicarbonate gradually decomposes when heated above about 120° C., with significant decomposition occurring between approximately 150° C. and 200° C. In general, the higher the temperature, the more quickly the sodium bicarbonate decomposes. An acid, such as citric acid, may also be included in the foaming additive, or added separately to the melt processable composition, to facilitate decomposition of the blowing agent. Chemical blowing agents are usually supplied in powder form or pellet form. The specific choice of the blowing agent will be related to the cost, desired cell development and gas yield, and the desired properties of the foamed material.

Suitable examples of blowing agents include water, carbonate and/or bicarbonate salts and other carbon dioxide releasing materials, diazo compounds and other nitrogen producing materials, carbon dioxide, decomposing polymeric materials such as poly (t-butylmethacrylate) and polyacrylic acid, alkane and cycloalkane gases such as pentane and butane, inert gases such as nitrogen, and the like. The blowing agent may be hydrophilic or hydrophobic. In one embodiment, the blowing agent may be a solid blowing agent. In another embodiment, the blowing agent may include one or more carbonate or bicarbonate salts such as sodium, potassium, calcium, and/or magnesium carbonate salts. For example, the blowing agent may include sodium carbonate and sodium bicarbonate, or, alternatively, sodium bicarbonate alone. In yet another embodiment, the blowing agent may be inorganic.

This invention discloses an improvement on the production of lightweight foamed beads. In the improved process, both a physical blowing agent and a chemical blowing agent are combined during the extrusion processes for the production of lightweight foamed beads. The physical blowing agent, preferably supercritical $CO_2$, is used as the primary source of the blowing agent during the production of lightweight beads by extrusion and hot face pelletization. By adding a chemical blowing agent to the extrusion process, such that the chemical blowing agent does not completely degrade during extrusion, the lightweight beads that are produced will retain some of the chemical blowing agent in their composition.

The secondary blowing agent may be incorporated in one of three ways. In the first case, the secondary blowing agent may be incorporated upstream of the primary blowing agent. In the second case, the secondary blowing agent may be incorporated downstream of the primary blowing agent. And, in the third case, the secondary blowing agent may be incorporated simultaneously with the primary blowing agent. Preferably, for all cases, the primary blowing agent is a physical blowing agent like supercritical $CO_2$. This primary blowing agent is used to provide the majority of the expansion during extrusion to produce the foamed beads. The objective of the secondary blowing agent is to remain largely dormant during the extrusion and foamed bead formation so that it can be triggered during subsequent processing of the foamed bead in order to enable further expansion of the bead. The process of the present invention is carefully designed so that the secondary blowing agent is not completely consumed during the extrusion foaming process. The process of the present invention allows the secondary blowing agent to remain largely intact through the extrusion foam process, allowing the secondary blowing agent to be incorporated into the foamed bead.

It is contemplated that chemical blowing agents are most appropriate for use as the secondary blowing agent. For cases one and two, the chemical blowing agent is added into the polymer melt of the extruder before or after the primary blowing agent is injected into the melt. Due to the elevated temperatures of the melt, it is possible that the chemical blowing agent will begin to decompose and contribute gas that can foam the polymer. By controlling temperature of the melt and the residence time of the polymer/blowing agent mixture in the extruder, the extent of decomposition of the blowing agent can be controlled. Some decomposition may occur to release gas, but as long as some of the blowing agent remains in the extrudate, the foamed beads will contain it.

For case three, the secondary blowing agent is mixed with the primary blowing agent and injected into the polymer melt simultaneously. It is contemplated that supercritical $CO_2$ is the primary blowing agent and a chemical blowing agent is used as the secondary blowing agent. The chemical blowing agent can be a liquid or a solid. In a preferred embodiment, supercritical $CO_2$ may be used as a carrier phase to dissolve the chemical blowing agent to form a mixture. The mixture is then injected into the barrel of the extruder to mix with the polymer melt.

The inclusion levels of the blowing agent in the concentrate may vary widely. In some embodiments, a foaming additive includes at least about 2.5 wt % of blowing agent, at least about 5 wt % of blowing agent, or, suitably, at least about 10 wt % of blowing agent. In other embodiments, the foaming additive may include about 10 to 60 wt % of blowing agent, about 15 to 50 wt % of blowing agent, or, suitably, about 20 to 45 wt % of blowing agent. In yet further embodiments, the foaming additive may include about 0.05 to 90 wt % of blowing agent, about 0.1 to 50 wt % of blowing agent, or about 1 to 26 wt % of blowing agent. The most preferred embodiment includes a concentration of the secondary blowing agent from 0.5 to 5% in the foamed bead.

Although the blowing agent composition may include only the blowing agents, a more typical situation is where the blowing agent includes a polymeric carrier that is used to carry or hold the blowing agent. Such blowing agent concentrate may be dispersed in the polymeric carrier for transport and/or handling purposes. The polymeric carrier may also be used to hold or carry any of the other materials or additives that are desired to be added to the melt processable composition.

In another aspect of the invention, the compostable or biobased, melt processable composition may contain other additives. Non-limiting examples of additives include plasticizers, chain extenders, antioxidants, light stabilizers, fibers, blowing agents, foaming additives, antiblocking agents, heat stabilizers, impact modifiers, biocides, compatibilizers, tackifiers, colorants, coupling agents, electrically conductive fillers, and pigments. The additives may be incorporated into the melt processable composition in the form of powders, pellets, granules, or in any other extrudable form. The amount and type of additives in the melt processable composition may vary depending upon the polymeric matrix and the desired physical properties of the finished composition. Those skilled in the art of melt processing are capable of selecting appropriate amounts and types of additives to match with a specific polymeric matrix in order to achieve desired physical properties of the finished material.

The amount of components in the melt processable, compostable or biobased polymer foam composition may vary depending upon the intended end use application. The compostable or biobased polymer may comprise from about 40 to about 99 percent by weight of the final composition. The compostable or biobased plasticizer may comprise from about 1 to 20 percent by weight of the final composition. The chain extender may comprise about 0.1 to 5 percent by weight of the final composition.

The physical blowing agent, such as supercritical $CO_2$, is combined with the melt early in the extruder mixing process. In one embodiment, the chemical blowing agent is added after the physical blowing agent, and in a relatively cooler portion of the extruder. In another embodiment, the chemical blowing agent is added before the physical blowing agent, again in a relatively cooler portion of the extruder. Then, as the mixture exits the extruder and is cut, the supercritical $CO_2$ expands to form the initial beads. These beads have the chemical blowing agent already impregnated in them during the extrusion process. The process must be carefully controlled so that the secondary blowing agent is not completely consumed during the extrusion foaming process. Due to the low temperature used in the extrusion process at the point of addition of the chemical blowing agent, it can remain dormant during the extrusion process. Subsequently, heating of the beads during a secondary expansion process, will liberate gases by thermal decomposition of the chemical blowing agent and thus, when combined with the right temperature for softening the plastic, allow for expansion of the material to lower density. During molding for example, the beads are heated so they will melt together and the chemical blowing agent is activated causing a secondary expansion. That is, the thermal degradation of the blowing agent could be triggered during molding to enable fusion of the beads or a traditional pre-expansion operation to further lower density.

The melt processable, compostable or biobased foam composition of the invention can be prepared by any of a variety of ways. For example, the compostable or biobased polymer, blowing agent, nucleating agent, and optional additives can be combined together by any of the blending means usually employed in the plastics industry, such as with a mixing extruder. In one preferred embodiment, the chemical blowing agent is incorporated into the extrusion process downstream of the injection and mixing of the physical blowing agent. However, as described above, the secondary blowing agent can be incorporated in the melt upstream of the injection and mixing of the physical blowing agent or simultaneously with the physical blowing agent. Typically, it is necessary to cool the extrusion mixture before exiting the die in order to maintain adequate melt strength and enable good cell structure of the foam. By adding the chemical blowing agent in the cooler region of the extruder, there is less thermal energy for decomposition of the chemical blowing agent and the resonance time of the material in the extruder is decreased. The materials (biodegradable polymer, blowing agent, biodegradable plasticizer, and optional additives) may be used in the form, for example, of a powder, a pellet, or a granular product. The mixing operation is most conveniently carried out at a temperature above the melting point or softening point of the polymer. The resulting melt-blended mixture can be processed into lightweight strands and subsequently cut into beads using a strand pelletizer. In another embodiment, foamed beads are produced by cutting the foamed strand at the face of the extrusion die. By cutting the extrudate at the face of the extrusion die, a bead is formed before complete expansion of the foam has occurred. After pelletization, a foamed bead is formed from expansion of the extrudate by the physical blowing agent. The foamed bead cools by the release of blowing agent, but subsequent cooling can be applied by contacting with water, water vapor, air, carbon dioxide, or nitrogen gas. The resulting beads can be molded into a three-dimensional part using conventional equipment utilized in molding expandable polystyrene. The objective of the secondary blowing agent is to remain largely dormant so that it can be triggered during subsequent processing of the foamed bead to enable further expansion of the bead. Preferably, the foamed beads contain residual chemical blowing agent and can be post expanded in the molding process.

Melt processing typically is performed at a temperature from about 80° to 300° C., although optimum operating temperatures are selected depending upon the melting point, melt viscosity, and thermal stability of the composition. Different types of melt processing equipment, such as extruders, may be used to process the melt processable compositions of this invention. Extruders suitable for use with the present invention are described, for example, by Rauwendaal, C., "Polymer Extrusion," Hansen Publishers, p. 11-33, 2001.

In one embodiment, the resulting compostable or biobased foamed bead has a specific gravity less than 0.15 $g/cm^3$. In another embodiment, the compostable or biobased foamed bead has a specific gravity of preferably less than 0.075 $g/cm^3$, and most preferably less than 0.05 $g/cm^3$.

In one embodiment, more than 50 wt % of the foam contains materials that are compostable, as determined by ASTM D6400. In a preferred embodiment, more than 80 wt % of the foam contains materials that are compostable. In a most preferred embodiment, greater than 95 wt % of the foam contains materials that are compostable.

The invention has been described with references to specific embodiments. While particular values, relationships, materials and steps have been set forth for purposes of describing concepts of the invention, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain embodiments and modifications of the concept underlying the present invention, various other embodiments as well as potential variations and modifications of the embodiments shown and described herein will obviously occur to those skilled in the art upon becoming familiar with such underlying concept. It is intended to include all such modifications, alternatives and other embodiments insofar as they come within the scope of the invention. It should be understood, therefore, that the invention might be practiced otherwise than as specifically set forth herein. Consequently, the present embodiments are to be considered in all respects as illustrative and not restrictive.

What is claimed is:
1. A method comprising:
    meltprocessing an admixture comprising a first blowing agent and a second blowing agent forming an extrudate to form a partially foamed compostable or biobased polymer extrudate bead comprising a chemical blowing agent that is introduced during meltprocessing; where said chemical blowing agent causes subsequent expansion of the extrudate bead.
2. The method of claim 1, wherein said second blowing agent is added downstream of injection and mixing of said first blowing agent.

3. The method of claim 1, wherein said second blowing agent is incorporated upstream of injection and mixing of said first blowing agent.

4. The method of claim 1, wherein said second blowing agent is incorporated simultaneously with injection and mixing of said first blowing agent.

5. The method of claim 1, wherein said first or second blowing agent comprises super critical $CO_2$.

6. The method of claim 1, wherein said first or second blowing agent comprises a carbonate salt or bicarbonate salt.

7. The method of claim 1, wherein said first or second blowing agent is selected from the group consisting of: sodium carbonate; sodium bicarbonate; calcium carbonate; potassium carbonate; and magnesium carbonate.

8. The method of claim 1, wherein said first or second blowing agent is selected from the group consisting of: azo compounds; hydrazine derivatives; semicarbazides; tetrazoles; nitroso compounds; and carbonates.

9. The method of claim 1, said admixture comprises a compostable or biobased polymer.

10. The method of claim 1, said admixture comprises a compostable or biobased polymer of polylactic acid.

11. The method of claim 1, further comprising:
extruding the extrudate through a die attached to an end of an extruder.

12. The method of claim 11, further comprising pelletizing the extrudate at the face of the die of the extruder.

13. The method of claim 11, further comprising:
cutting the extrudate with a rotary blade in contact with the front end surface of the die while allowing the extrudate to foam to produce foamed beads.

14. The method of claim 13, wherein pelletization of the extrudate at the face of the extrusion die occurs prior to complete expansion of said first blowing agent in the extrudate.

15. The method of claim 13, wherein foaming of the bead occurs after pelletization of the extrudate.

16. The method of claim 1, further comprising:
expanding the foam beads by application of heat.

17. The method of claim 1, further comprising:
moving the foam beads into a mold; and
further expanding and fusing the beads in the mold by application of heat.

18. The method of claim 1, wherein the bead is capable of holding an internal pressure inside the closed cell structure providing volumetric expansion of the foamed bead during heating.

19. A method for producing a foamed molded product, comprising the steps of:
creating foamed beads according to the method of claim 13;
bringing the foamed beads under temperature and pressure conditions so that a foamed molded product is obtained.

20. The method of claim 19, wherein the method uses heated gas to promote fusion of the foamed beads.

21. The method of claim 20, wherein the method uses steam.

22. The method of claim 20, wherein the method uses air or a mixture of air and steam.

23. A composition of matter, comprising:
a partially foamed biobased or compostable polymer bead containing a dormant chemical blowing agent in sufficient quantity to cause further expansion of the bead, wherein said dormant chemical blowing agent was introduced during melt processing of the bead.

24. The composition of claim 23, said compostable polymer comprising a polymer of polylactic acid.

25. The composition of claim 23, wherein the dormant chemical blowing agent has a concentration of 0.5 wt % to 5 wt % in the bead.

26. The composition of claim 25, wherein said bead is capable of holding an internal pressure of gas in excess of ambient conditions within the closed cell structure of the foam.

27. A method comprising:
meltprocessing a biobased or compostable polymer with both a physical and chemical blowing agent to form at least a partially foamed compostable or biobased polymer extrudate bead, wherein at least a portion of the chemical blowing agent remains latent in the at least partially foamed extrudate.

28. The method of claim 27, further comprising:
activating the latent chemical blowing agent.

29. The method of claim 28, wherein the activation method uses heat.

30. The method of claim 28, wherein the activation method uses steam, air, or a mixture of steam and air.

31. A composition of matter, comprising:
a partially foamed extrudate bead of a compostable or biobased polymer, comprising a chemical blowing agent that is introduced during melt processing and formation of the partially foamed compostable or biobased extrudate bead; where said chemical blowing agent causes subsequent expansion of the extrudate bead.

32. The composition of claim 31, said extrudate bead comprising a compostable or biobased polymer of polylactic acid.

33. The composition of claim 31, said bead having a substantially closed cell structure.

34. The composition of matter of claim 23, wherein the dormant chemical blowing agent has a concentration of 0.1 wt % to 50 wt % in the bead.

35. The composition of matter of claim 31, wherein the chemical blowing agent has a concentration of 0.1 wt % to 50 wt % in the bead.

* * * * *